Patented June 6, 1933

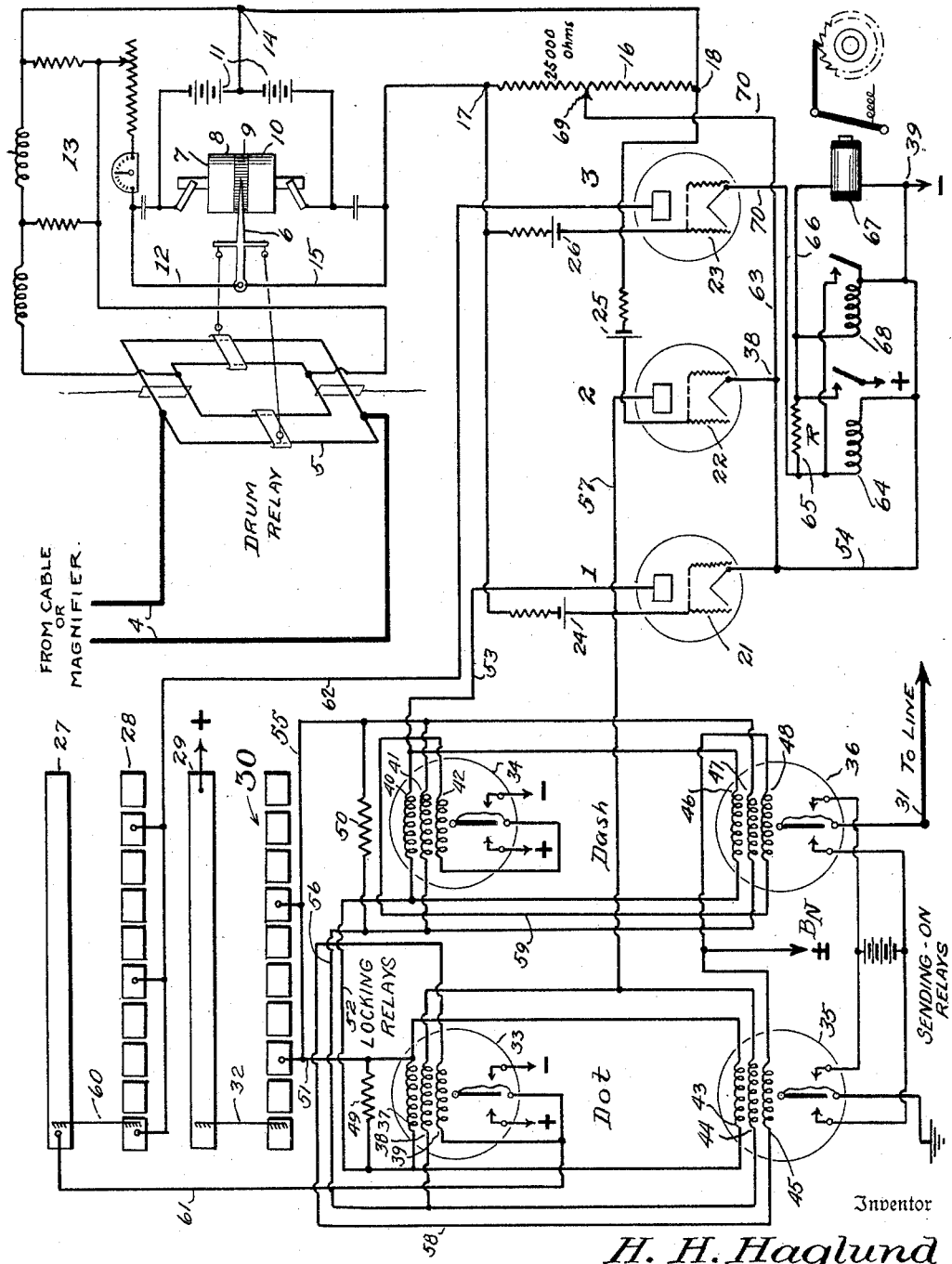

1,913,307

UNITED STATES PATENT OFFICE

HAKON H. HAGLUND, OF FLUSHING, NEW YORK, ASSIGNOR TO THE WESTERN UNION TELEGRAPH COMPANY, OF NEW YORK, N. Y., A CORPORATION OF NEW YORK

TELEGRAPH SYSTEM ADAPTED FOR OCEAN CABLE TELEGRAPHY

Application filed January 7, 1931. Serial No. 507,236.

This invention relates to telegraph repeating apparatus and in particular to the application to ocean cable repeaters of grid-controlled gaseous tubes of which there are various types, such as the well-known thyratron, the grid glow tube, etc., tubes of this character being sometimes referred to as grid-controlled rectifiers.

The principal object of the invention is to simplify the repeater and to eliminate the use of sensitive relays working from the drum circuit.

In general, objects of the invention include:

Reducing the magnitude of the current carried through the drum;

Lessening drum maintenance;

Increasing the sensitivity, speed and reliability of operation of the repeater.

Specific objects of the invention are to reduce the number of relays required, and in particular to substitute grid-controlled rectifier tubes for the drum local relays and to dispense with the pick-up relays; to use such tubes for performing the function of the eliminated relays; also to use a tube of this character in place of the normal corrector relay.

Signals from non-loaded cables are usually received on some type of galvanometer type relay. Very long cables work into a Heurtley or similar magnifier which in turn works into a drum relay, Heurtley relay or some similar type relay. All of these instruments are galvanometer type instruments. The drum or Heurtley type instruments, because of their delicate mechanism, can carry only very small currents. In the drum relay, the contacting mechanism consists of a very fine pointer which is caused to move by two quartz fibres attached to the galvanometer coil. The pointer makes contact with the surface of a drum which consists of three silver discs separated from one another by mica insulation. The surfaces (edges) of these three discs are very carefully ground and the drum is kept in rotation in order to lessen the friction of the pointer as it is made to travel back and forth. The center disc of the drum, or so-called "no man's land", is simply an open circuit position, the left and the right hand discs serving to pick up current from the local battery.

At present, the tongue circuit works into the so-called drum local relays which are normally connected in series with a so-called correction circuit, the latter feeding back on the drum galvanometer. Since the current in this pointer circuit must be kept small in order not to injure the face of the drum, it requires a very high grade of maintenance in order to keep the relays operating properly. Even under these conditions, failures occur due to erratic operation of the drum local relays.

In a normal rotary repeater hook-up, the drum local relays work into pick-up relays on the rotary repeater which in turn operate lock-up relays and sending-on relays.

According to the present invention grid-controlled rectifier tubes are substituted in place of the drum local relays. A tube of this type is also substituted for the normal corrector relay. With such tubes the pick-up relays may be dispensed with, so that the complete rotary repeater requires only the use of three tubes and four relays, whereas the conventional type requires nine relays.

Since these tubes require only microamperes to operate them, the current carried through the drum is materially reduced, thus lessening the drum maintenance, and since the tubes are much more sensitive and quicker in their operation than relays, reliable operation is produced.

The single figure of the drawing shows the invention applied to a system of the rotary repeater type.

On the drawing, the grid-controlled gaseous tubes are represented by the numerals 1, 2 and 3. These tubes, which are familiar to engineers, are of the three electrode type having a gaseous filling, such as mercury vapor, each comprising an anode, a cathode and a starting electrode which are so constructed and arranged that with a suitably poled source of voltage connected in the anode-cathode circuit, current continues to flow in the anode cathode circuit unaffected by the potential of the starting electrode after being started by a critical voltage applied to the starting electrode. For convenience I have hereinafter and in the claims referred to tubes having these characteristics as thyratron tubes but it is to be understood that I intend to cover thereby any of the grid-controlled tubes in this description.

The conductors 4 extend from the cable or magnifier (not shown) to a drum relay represented generally by the numeral 5. The pointer 6 of the drum relay makes contact with the surface of drum 7. The three drum discs are represented at 8, 9 and 10, 9 indicating the open circuit position or "no man's land", while discs 8 and 10 serve to pick up current from the local battery 11.

Conductor 12 extends from pointer 6 to the corrector network 13 which may have the form of a resistance and inductance shunt. This shunt has not been altered from the standard form except that the drum local relays which are normally in this circuit have been removed (see Fig. 2 of patent to Herbert Angel No. 1,747,853). The circuit extending from pointer 6 through corrector network or shunt 13, is completed by one or the other of the outer discs of the drum surface by way of a terminal or point 14 connected to the midpoint of the local battery 11.

A conductor 15 extends from pointer 6 through a 25,000 ohm resistance 16 having upper and lower terminals 17 and 18, respectively. The circuit extending from pointer 6 through resistance 16 is completed by one or the other of the outer discs of the drum surface by way of the above mentioned terminal 14 connected to the midpoint of the local battery. The value 25,000 ohms is given by way of example; it is obvious that other values of resistance may be used.

It will be apparent that the direction of current flowing through the corrector circuit 13 will depend upon the position of the pointer 6. When the pointer is in contact with disc 10 positive potential is applied to the pointer 6 from local battery 11. When the pointer is in contact with disc 8 negative potential is applied to pointer 6 from local battery. When the pointer is in contact with disc 9, the circuit is open and no current flows from the local battery.

When positive potential is applied from local battery 11 to the pointer 6 the flow of current from local battery through resistance 16 is such as to tend to make the upper terminal 17 positive and the lower terminal 18 negative with respect to an intermediate tap 69 which is connected by a conductor 70 to the filaments of tubes 1 and 2. When negative potential is applied from local battery 11 to the pointer 6, terminal 17 tends to become negative and terminal 18 positive.

The drop in voltage across the portions 17—69 and 18—69 of resistance 16, whether it be positive or negative, is superimposed upon the normal biasing voltage of grids 21 and 23 of thyratrons 1 and 3 respectively, while the potential, positive or negative, of terminal 18 is superimposed upon the normal biasing voltage of grid 22 of thyratron 2. The grids 21 and 22 of tubes 1 and 2 are normally biased by a small positive potential from the batteries 24 and 25, respectively. The third or corrector tube 3 is biased from a battery 26 by a small negative potential. The purpose of biasing the three tubes in this particular manner will be explained hereinafter.

The circuits described in the preceding paragraphs constitute the control or starting circuits of the thyratron tubes which are effective to start, or to prevent the starting of the flow of current in the anode-cathode circuits of the tubes.

A distributor comprising alternate solid and segmented rings 27, 28, 29 and 30 serves to complete the anode-cathode circuits of the thyratron tubes, for the ultimate purpose of retransmitting signal impulses of the proper polarity into the line 31. Brushes 32 connect the solid ring 29 to segments of ring 30 whereby certain windings of the dot and dash relays 33 and 34 and of the sending-on relays 35 and 36 are energized in a manner dependent upon whether the grid of tube 1 or of tube 2, or of both, has been made positive. Each of the dot, dash and sending-on relays comprises three coils, the three coils of the dot relay being indicated at 37, 38 and 39. The coils of dash relay 34 are shown at 40, 41 and 42, and of the respective sending-on relays at 43, 44, 45 and 46, 47, 48. A shunt 49 is connected across coil 37 of dot relay 33, and a shunt 50 across coil 41 of dash relay 34.

When application of a positive potential to the grid of thyratron tube 1 renders this tube conducting, a circuit may be traced from positive battery on solid ring 29 through brushes 32, a segment of ring 30, conductor 51, shunt 49 and coils 37 and 43 of relays 33 and 35 all three in parallel, conductor 52, coils 40 and 46 of relays 34 and 36 in parallel, conductor 53 to the plate of tube 1, thence to the filament of tube 1, terminal 38 and conductor 54 to negative battery. The current flow through coils 40 and 46 is in opposite direction to its flow through the coils 37 and 43. Completion of the circuit just traced causes the dot relays to go to their right hand or marking contacts and the dash relays to go to their left hand or spacing contacts.

When the application of a critical potential to the grid of thyratron tube 2 renders tube 2 conducting a circuit may be traced from positive battery on solid ring 29, brushes 32, a segment of ring 30, conductor 55, shunt 50 and coils 41 and 47 of relays 34 and 36 in parallel, conductor 56, coils 38 and 44 of relays 33 and 35 in parallel, and conductor 57 to the plate of tube 2, thence through the tube to the filament, and through terminal 38 and conductor 54 to negative battery. The current flow through coils 38 and 44 is in opposite direction to its flow through coils 41 and 47. Completion of the above circuit causes the dot relays to go to their left-hand or spacing contacts and the dash relays to go to their right hand or marking contacts.

Coils 39 and 45 of the dot relays and coils 42 and 48 of the dash relays are locking windings the object of which is to assure that after the relays have once been operated to their spacing or marking contacts, they will not leave the contacts until a new circuit is picked up through the distributor segments. Current for the locking circuit is supplied from the tongue of the locking relay and through its corresponding sending-on relay to neutral battery. Thus, when the contact of dot locking relay 33 is moved to its left-hand or spacing contact, a locking circuit is completed from positive battery through tongue and locking winding 39 of relay 33, conductor 58, coil 45 of dot sending-on relay 35 to neutral battery indicated at $B_N$. When the contact is moved to its right-hand contact a locking circuit is completed from negative battery through the same circuit, comprising tongue and locking winding 39 of relay 33, conductor 58 and coil 45 of relay 35 to neutral battery. When the dash locking relay is moved to its left-hand or spacing contact, a locking circuit is completed from positive battery through tongue and locking winding 42 of dash locking relay 34, conductor 59 and coil 48 of dash sending-on relay to neutral battery, while movement of the contact to its right-hand or marking contact completes a similar circuit from negative battery through tongue and locking winding of relay 34, conductor 59, coil 48 of relay 36 to neutral battery.

It is apparent that the movement of the tongue of the dot sending-on relay 35 to its right hand contact while the dash sending-on relay remains on its left hand contact sets up a circuit in which negative battery is connected through the tongue and contact of the dash relay to line, while positive battery is connected through the tongue and contact of the dot relay to earth. Movement of the tongue of the dash sending-on relay 36 to its right hand contact while the dot sending-on relay 35 remains on its left hand or spacing contact sets up a circuit in which negative battery is connected through the tongue and contact of the dot relay to earth while positive battery is connected to the contact and tongue of the dash relay to the line. If both relays remain on their spacing or left hand contacts, the line is connected through the tongues and contacts of both relays to earth.

It will be noted that the batteries 24 and 25 connected to grids of thyratron tubes 1 and 2 are poled with the plus side of the batteries towards the grids. The grids of tubes 1 and 2 are both positive due to the small grid biasing battery even when no current is flowing through the 25,000 ohm resistance, which is the condition existing when the tongue or pointer 6 of the drum relay is on the insulated section 9, usually referred to as "no-man's-land". Under these circumstances both tubes 1 and 2 are in condition to start when brushes on the lower set of distributor rings make contact with a live segment.

The corrector thyratron tube 3, being normally biased negative by means of the small battery 26, is non-conductive except when the terminal 17 of resistance 16 is positive. If the grid of tube 3 becomes positive before the corrector brushes 60 have left a live corrector segment, a circuit may be traced from plus battery of the spacing contact of dot relay 33 by way of conductor 61, solid ring 27, brushes 60, segment of ring 28, conductor 62 to the plate of tube 3, thence via the tube and its filament, conductor 63, the coil of the "make" relay 64 to negative battery. Operation of the "make" relay establishes three circuits:

(1) A locking circuit for make relay 64, which extends from positive battery and the contact of make relay 64 to conductor 54 and negative battery.

(2) An operating circuit for the corrector magnet which extends from positive battery, contact of relay 64, conductor 66 and the coil of corrector magnet 67 to negative battery.

(3) An operating circuit for the slow-operating shunt relay which extends from positive battery, contact of relay 64, the coil of shunt relay 68 to conductor 54 and negative battery. The shunt relay 68 is adjusted so as to be slower in its operation than the corrector magnet 67. When the shunt relay operates, the closing of its contacts shunts out the coil of the make relay 64, which therefore releases its contact to open its locking circuit.

The operation of the circuit is as follows: When an incoming signal causes the tongue 6 of drum relay to make contact with disc 10, current flows from battery 11 through resistance 16 in such a way as to make terminal 17 and its associated grid 21 positive and terminal 18 and its associated grid 22 negative with respect to the intermediate variable tap 69, to which the filaments are connected. Tube 2 by reason of the negative potential thus impressed on its normal positive biasing potential is prevented from starting; but tube 1 starts when brushes on the lower set of distributor rings make contact with a live segment. Coil 37 of dot locking relay 33 and coil 43 of dot sending-on relay are operated by current flowing through them in one direction, and coil 40 of dash locking relay and coil 46 of dash sending-on relay 36 are operated by current flowing through them in the opposite direction. The dot relays therefore go to their right hand or marking contacts and lock up over their coils 39 and 45. The dash relays go to their left hand or spacing contacts and lock up over their coils 42 and 48. The sending-on relays 35 and 36 consequently transmit a dot signal into the next cable in the normal manner.

When an incoming signal causes the drum pointer to make contact with disc 8, current flows from battery 11 through resistance 16 in such a way as to make terminal 17 with its associated grid 21 negative, and terminal 18 with its associated grid 22 positive with respect to their filaments. Tube 1 by reason of the negative potential thus impressed on its normal positive biasing potential is prevented from starting, but tube 2 starts when brushes on the lower set of distributor rings make contact with a live segment. Coil 41 of dash locking relay 34 and coil 47 of dash sending-on relay 36 are operated by current flowing through them in one direction, while coil 38 of dot locking relay 33 and coil 44 of dot sending-on relay are operated by current flowing through them in the opposite direction. The dash relays therefore go to their right hand or marking contacts, and lock up over their coils 42 and 48. The dot relays go to their left hand or spacing contacts, and lock up over their coils 39 and 45. The sending-on relays 35 and 36 consequently transmit a dash signal into the next cable.

When the tongue of the drum relay is on "no man's land" and no current is flowing through resistance 16, the grids 21 and 22 of tubes 1 and 2 are both positive due to their normal biasing batteries 24 and 25. Both tubes will start, therefore, when the brush makes contact with the live segment on the distributor. Current will therefore flow in both the thyratron circuits previously described. That is, current will flow in one direction through coil 37 of dot locking relay 33 and coil 43 of dot sending-on relay 35 and in the other direction through coil 38 of the dot locking relay and coil 44 of dot sending-on relay 35. Similar current will flow in opposite directions through the coils 40 and 41 of dash locking relay 34 and coils 46 and 47 of dash sending-on relay 36. Since the shunts 49 and 50 are in parallel with the circuits which tend to mark the relays, thus keeping the current tending to mark the relays at about half the value which tends to space the relays, all four relays 33, 34, 35 and 36 are operated to their spacing contacts, thereby transmitting a zero or space into the next section of the cable.

The third thyratron is used to operate the corrector circuit in the following manner: With the dot relay on its left hand or spacing contacts, plus battery is supplied to the first upper solid ring 27 of the distributor. If, as the brush is passing over the live correcting segment, the tongue 6 of the drum relay moves to the lower or dot side, current will flow through tube 3 to negative battery by way of relay 64 of the synchronizing unit comprising make relay 64 and shunt relay 68. This will operate the corrector in the normal manner, thus stepping the correcting mechanism, which latter is indicated only diagrammatically on the drawing. For use with this circuit the correcting mechanism should step forward so as to move the brush forward off the live distributor segment. When the brush on the lower set of segments arrives at a pick-up segment (since the tongue of the drum relay is on the dot side) the dot relay will operate, thus removing battery from the solid corrector ring and the plate of tube 3, and making it impossible to operate again until after a dash or space has been received. The corrector can therefore operate only at the moment when the signal is changing from a dash or space to a dot signal.

If the distributors are in proper synchronism, the corrector brush will just have passed off a live segment when the drum pointer moves to the dot side of the relay.

To facilitate a clear understanding of the operation of the circuit it may be well to emphasize the following points:

The object of having the grids of tubes 1 and 2 normally biased by a small positive potential is to permit both tubes to start if the drum relay is on "no man's land" at the time of pick-up, even though no voltage is being received from the drum relay. If the tongue of the drum relay is in contact with either one disc or the other, one of tubes 1 or 2 will become sufficiently negative to prevent its starting.

When an incoming dot signal causes the tongue of the drum relay to move into its (lower) dot position, the dot relays (33 and 35) are operated to their (right-hand) marking contacts and the dash relays (34 and 36) are operated to their (left-hand) spacing contacts. This results in the retransmission of a dot (negative) signal into the outgoing cable or line section 31.

When an incoming dash signal causes the tongue of the drum relay to move into its (upper) dash position, the dot relays (33 and 35) are operated to their (left-hand) spacing contacts and the dash relays (34 and 36) are operated to their (right-hand) marking contacts. This results in the retransmission of a dash (positive) signal into the outgoing cable section.

When a zero signal is received, the tongue of the drum relay moves into its (middle) zero position on "no-man's-land", and zero signal is transmitted into the outgoing cable section because both tubes are normally in operative condition and the operation of both simultaneously, causes all four relays (33, 34, 35 and 36) to go to their spacing contacts.

The third thyratron tube is normally biased by a small negative potential so that it will not start unless through the operation of the drum a plus signal is impressed on its grid.

The connection of plus battery to the plate of corrector tube 3 is controlled by movement of the tongue of the dot relay 33. When the dot relay moves to its marking contact, plus battery is removed from the plate of tube 3. Connection of the plus battery is not restored until after a dash or space has been received, causing movement of the dot relay to its spacing contact. As pointed out above, the brush corrector mechanism can operate only at the moment when the signal is changing from a dash or space to a dot signal at which time a positive potential is applied to the negative grid of tube 3 if the system is out of phase.

It is evident that the invention is not limited in scope to the specific form in which it is here disclosed, but includes variations and modifications which will be apparent to engineers skilled in this art, and which need not here be considered in detail. For example the invention is not limited to the specific circuit disclosed in which the corrector thyraton tube operates the corrector indirectly by means of intermediate relays. Nor is the invention limited to the specific type and number of dot and dash relays illustrated although this form is preferred because of the simplification it effects in the repeater circuit. Furthermore instead of the drum relay shown for the purpose of illustrating an embodiment of the invention, it is obvious that other types of cable relays such as the well known Heurtley relay, may be employed and such other types are intended to be covered by the claims under the general term drum relay.

I claim:

1. A signaling circuit comprising a pair of cable sections connected through a rotary repeater, a cable relay for said rotary repeater, a pair of tubes of the thyratron type under control of said relay, means for retransmitting signals into the outgoing cable section, and means under control of either one or both of said thyratron tubes for determining the polarity of the retransmitted signals.

2. A signaling circuit comprising a pair of cable sections connected through a rotary repeater, a drum relay for said rotary repeater and a pair of sending-on relays adapted to transmit positive and negative current into the outgoing cable section, a pair of tubes of the thyratron type under control of said drum relay and circuits connecting said tubes and sending-on relays for determining the operation of said sending-on relays.

3. A signaling circuit comprising a pair of cable sections connected through a rotary repeater, a drum relay for said rotary repeater, a pair of tubes of the thyratron type under control of said drum relay, plate circuits for said tubes comprising windings of dot and dash relays, a pair of sending-on relays under control of said tubes and said dot and dash relays, and means under control of said sending-on relays for transmitting signals into the outgoing cable section.

4. A signaling circuit comprising a pair of cable sections connected through a rotary repeater, a drum relay for said rotary repeater, a pair of tubes of the thyratron type having grid circuits controlled by signals incoming to said drum relay from one cable section, a pair of sending-on relays connected to said tubes and to the other cable section, and means comprising dot and dash locking relays for operating one or the other of said tubes and its associated sending-on relay in accordance with the condition of its grid circuit to retransmit the signals into the other cable section.

5. A signaling circuit comprising a pair of cable sections connected through a rotary repeater, a three-position drum relay for said rotary repeater, a pair of tubes of the thyratron type having grid circuits controlled by signals incoming to said drum relay to render the grids of one or the other or both of said tubes positive according to the position taken by said drum relay, plate circuits for said tubes including windings of a pair of sending-on relays, and means under control of said tubes for operating one or the other of said relays to marking position or for operating both of said relays to spacing position in a manner dependent upon the position of said drum relay.

6. A signaling circuit comprising a pair of cable sections connected through a rotary repeater, a three-position drum relay for said rotary repeater, a pair of tubes of the thyratron type, means for starting one or the other or both of said tubes depending on the position of said drum relay, a pair of sending-on relays under control of said tubes, means for operating one of said relays to its marking position when one of said tubes is operated, means for operating the other said relay to its marking position when the other said tube is operated and means for operating both of said relays to their spacing positions when both said tubes are operated.

7. A signaling circuit comprising a pair of cable sections connected through a rotary repeater, a three-position drum relay for said rotary repeater, a pair of tubes of the thyratron type having grid circuits controlled by signals incoming to said drum relay to prevent operation of one or the other of said tubes or to permit operation of both tubes depending on the position taken by said drum relay, a plate circuit for one of said tubes including marking windings of a dot locking and dot sending-on relay and spacing windings of a dash locking and dash sending-on relay, a plate circuit for the other tube including spacing windings of said dot locking and dot sending-on relay and marking windings of said dash locking and dash sending-on relays, and shunts for said marking windings.

8. A signaling circuit comprising a pair of cable sections connected through a rotary repeater, a three-position drum relay for said rotary repeater, a pair of tubes of the thyratron type, plate circuits for said tubes and a source of plate current adapted to be connected to said plate circuit at predetermined intervals during rotation of said repeater, means for starting at said predetermined intervals one or the other or both of said tubes depending on the position of said drum relay, a pair of sending-on relays adapted to transmit positive, negative and zero signals into the outgoing cable section, and means under control of the plate circuits of said tubes for operating said sending-on relays in accordance with the condition of operation of one or the other or both of said tubes.

9. An ocean cable repeater comprising a pair of cable sections and a rotary repeater circuit therebetween, means to retransmit signals into the outgoing cable section, a pair of tubes of the thyratron type for controlling said retransmitting means connected in said repeater circuit having their grids normally biased by a potential sufficient to start the tubes when plate current is connected to the tubes, a drum relay connected to the incoming cable section adapted to carry only very small currents of the order of microamperes, means responsive to said incoming small currents for applying a neutralizing potential to one or the other of said biased grids.

10. An ocean cable repeater comprising a pair of cable sections and a rotary repeater circuit therebetween, a pair of sending-on relays under the control of a pair of tubes of the thyratron type in said repeater circuit, the grids of said tubes being normally biased by a potential sufficient to start the tube when plate current is connected thereto, a drum relay connected between said incoming cable section and the grid circuits of said tubes having circuits arranged to change the potential of one or the other of said grids in accordance with the potential of the incoming signals, and to thereby determine the manner of operation of said sending-on relays.

11. In combination, a transmission circuit, a pair of transmission circuit devices which are adapted to be operated in synchronism, correcting mechanism for restoring synchronism when said devices get out of step, a tube normally inoperative and of the thyratron type connected to said correcting mechanism to control the operation thereof and means responsive to current incoming from said circuit for starting said tube only when said devices are out of step.

12. In combination a signaling circuit, a pair of distributors connected thereby adapted to be operated in synchronism, a corrector relay and correcting mechanism controlled thereby for restoring synchronism when said distributors get out of step, a tube of the thyratron type connected to control the operation of said relay and means responsive to signals incoming from said circuit for starting said tube when said distributors are out of step.

13. In combination a signaling circuit, a pair of distributors connected thereby adapted to be operated in synchronism, correcting mechanism for maintaining synchronism, a tube of the thyratron type having a grid normally biased to prevent operation of said correcting mechanism, and means responsive to incoming signals for applying a starting potential to the grid of said tube.

14. In combination a signaling circuit, a pair of distributors connected thereby adapted to be operated in synchronism, correcting mechanism for restoring synchronism when said distributors get out of step, a tube of the thyratron type having a grid circuit including a source of biasing potential, a source of plate current for said tube, means responsive to incoming signals for superimposing a starting potential on said grid, and means for connecting said source of plate current to the tube when said distributors get out of step.

15. A signaling circuit comprising a pair of cable sections and a distributor connected to one of said sections, a rotary repeater connected between said cables comprising a distributor adapted to operate in synchronism with said first mentioned distributor, a drum relay for said rotary repeater, a pair of tubes of the thyratron type and a third tube of the thyratron type under control of said drum relay, means under control of said pair of thyratron tubes for retransmitting signals into the outgoing cable section and means under control of said third tube for maintaining synchronism between said distributors.

16. A signaling circuit comprising a pair of cable sections and a distributor connected to one of said sections, a rotary repeater connected between said cable sections comprising a distributor adapted to operate in synchronism with said first mentioned distributor, a drum relay for said rotary repeater, a pair of tubes of the thyratron type and a third tube of the thyratron type under control of said drum relay, a pair of sending-on relays adapted to transmit signals of different character into the outgoing cable section, means under control of said pair of tubes for selectively operating said sending-on relays in accordance with incoming signals, a corrector relay and corrector mechanism adapted to restore synchronism between said distributors when they get out of step and means under control of said third tube for operating said corrector relay.

17. In combination, a pair of cable sections and a distributor connected to one of said sections, a rotary repeater connected between said cable sections comprising a distributor adapted to operate in synchronism with said first mentioned distributor, a drum relay for said rotary repeater, a pair of tubes of the thyratron type and a third tube of the thyratron type having their grid circuits under control of said drum relay and their plate circuits under control of said second mentioned distributor, means responsive to incoming signals in said drum relay for preventing the operation of one or the other of said pair of tubes, means responsive to incoming signals and under control of said distributor for starting operation of said third tube when said distributors get out of step, signal transmitting apparatus under control of said pair of tubes and connected to the outgoing cable, and corrector mechanism for said repeater distributor under control of said third tube.

18. An ocean cable repeater comprising a drum relay, and a pair of sending-on relays the latter arranged to transmit signals into an outgoing cable section, a pair of tubes of the thyratron type connected to control said sending-on relays and arranged to have a normal bias, means to derive starting potentials from the currents in said drum relay and to superimpose said starting potentials upon said biased tubes to thereby prevent operation of one tube and to permit operation of the other.

19. A signaling circuit comprising a pair of cable sections and a distributor connected to one of said sections, a rotary repeater connected between said cable sections comprising a distributor adapted to operate in synchronism with said first mentioned distributor, a drum relay and a pair of sending-on relays, the latter arranged to transmit signals into an outgoing cable section, a pair of tubes of the thyratron type connected to control said sending-on relays, a corrector relay adapted to control synchronism between said distributors, a third tube of the thyratron type connected to control said corrector relay, and means responsive to signals from said drum relay for applying starting potentials to said tubes.

In testimony whereof I affix my signature.

HAKON H. HAGLUND.